(12) United States Patent
Yamaguchi et al.

(10) Patent No.: US 10,731,746 B2
(45) Date of Patent: Aug. 4, 2020

(54) POWER TRANSMISSION APPARATUS

(71) Applicant: Honda Motor Co., Ltd., Tokyo (JP)

(72) Inventors: Nobutaka Yamaguchi, Saitama (JP); Kenji Niwata, Saitama (JP); Fumiya Yoshida, Saitama (JP); Eisuke Hosoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/981,907

(22) Filed: May 17, 2018

(65) Prior Publication Data

US 2018/0335128 A1    Nov. 22, 2018

(30) Foreign Application Priority Data

May 19, 2017    (JP) ................. 2017-099881

(51) Int. Cl.
*F16H 57/04* (2010.01)
*F16H 48/22* (2006.01)
*F16H 57/037* (2012.01)
*F16H 48/19* (2012.01)

(52) U.S. Cl.
CPC ......... *F16H 57/0445* (2013.01); *F16H 48/19* (2013.01); *F16H 48/22* (2013.01); *F16H 57/037* (2013.01); *F16H 57/0424* (2013.01); *F16H 57/0457* (2013.01); *F16H 57/0461* (2013.01); *F16H 57/0473* (2013.01); *F16H 57/0483* (2013.01); *F16H 57/0441* (2013.01)

(58) Field of Classification Search
CPC ............. F16H 57/0424; F16H 57/0445; F16H 57/0473; F16H 57/0483; F16H 57/0493; F16H 57/0495; F16H 57/0441
See application file for complete search history.

(56) References Cited

U.S. PATENT DOCUMENTS

2014/0290407 A1*  10/2014  Tsuchihashi ............ F16D 48/02
                                                          74/405

FOREIGN PATENT DOCUMENTS

| CN | 201902810 | 7/2011 |
|---|---|---|
| CN | 203375498 | 1/2014 |
| CN | 103835803 | 6/2014 |
| CN | 104074495 | 10/2014 |
| DE | 102006044218 | 4/2007 |

(Continued)

OTHER PUBLICATIONS

Office Action of China Counterpart Application, with English translation thereof, dated Aug. 8, 2019, pp. 1-15.

(Continued)

*Primary Examiner* — Erin D Bishop
(74) *Attorney, Agent, or Firm* — JCIPRNET

(57) ABSTRACT

The power transmission apparatus includes: a gear chamber, used for accommodating gears disposed on a rotating shaft used for transmitting power to a drive wheel; a clutch chamber, disposed adjacent to the gear chamber in an axial direction of the rotating shaft, and used for accommodating a clutch used for disconnecting or connecting the power transmitted by the rotating shaft to the drive wheel; and a communicating hole, used for communicating the clutch chamber with the gear chamber, where an inclined surface facing toward the communicating hole is provided on an inner surface inside the clutch chamber opposite to an outer peripheral surface of the clutch.

7 Claims, 8 Drawing Sheets

(56) References Cited

FOREIGN PATENT DOCUMENTS

| | | |
|---|---|---|
| JP | 2014194242 | 10/2014 |
| JP | 2016125558 | 7/2016 |

OTHER PUBLICATIONS

"Office Action of China Counterpart Application", dated Mar. 13, 2020, with English translation thereof, pp. 1-13.

* cited by examiner

POWER TRANSMISSION APPARATUS

CROSS-REFERENCE TO RELATED APPLICATION

This application claims the priority benefit of Japan application serial no. 2017-099881, filed on May 19, 2017. The entirety of the above-mentioned patent application is hereby incorporated by reference herein and made a part of this specification.

BACKGROUND OF THE INVENTION

1. Field of the Invention

The disclosure relates to a power transmission apparatus mounted on a vehicle and used for transmitting power from a drive source such as an engine to a drive wheel.

2. Description of Related Art

A power transmission apparatus is used for transmitting power from a drive source such as an engine to a drive wheel in a vehicle. For example, as shown in Patent Document 1, a power transmission apparatus includes: a gear mechanism, including a drive bevel gear (pinion gear), integrally rotating with a drive shaft extending along a front-to-rear direction of the vehicle, and a driven bevel gear (ring gear), engaged with the drive bevel gear; a rotating shaft, disposed orthogonal to the drive shaft, and integrally rotating with the driven bevel gear; and left and right oil pressure clutches, disposed between left and right ends of the rotating shaft and axles connected to a pair of drive wheels.

In the power transmission apparatus of Patent Document 1, in an axial direction of the rotating shaft, a gear chamber used for accommodating the gear mechanism is disposed in the center, and clutch chambers used for accommodating the left and right oil pressure clutches are respectively disposed at two sides of the gear chamber. Moreover, the power transmission apparatus includes an oil pump, and the oil pump conveys oil stored in the gear chamber to the left and right oil pressure clutches. By using the oil pump, oil sucked from the gear chamber in the center is supplied to piston chambers of the clutches, and then are discharged into the clutch chambers at the two sides. The oil discharged into the clutch chambers returns to the gear chamber in the center through a communicating hole that communicates the clutch chambers with the gear chamber. That is, the power transmission apparatus is a structure that circulates oil between the gear chamber in the center and the left and right clutch chambers.

In the foregoing power transmission apparatus having an oil circulation structure, especially in a situation where a temperature of the oil is low or viscosity is high, the following problems exist: the oil return from the clutch chambers at the two sides to the gear chamber in the center is poor, and an oil surface of the gear chamber is difficult to be kept at a higher position. Furthermore, because of a structure that an oil strainer is disposed near the gear mechanism that is disposed in the gear chamber in the center and that is used for transmitting power, once the oil surface of the gear chamber excessively decreases, there may further be a risk that the oil sucked from a suction opening of the oil strainer is mixed with air (aeration).

[Patent Document 1]: Japanese Laid-open No. 2014-194242

SUMMARY OF THE INVENTION

The power transmission apparatus of an embodiment of the disclosure is a power transmission apparatus (100) mounted on a vehicle, and characterized by including: a rotating shaft (4), extending along a width direction of the vehicle, and used for transmitting power to a drive wheel of the vehicle; gears (2, 3), disposed on the rotating shaft (4), and used for transmitting power to the rotating shaft (4); a clutch (5R or 5L), used for disconnecting or connecting the power transmitted by the rotating shaft (4) to the drive wheel; a gear chamber (15), used for accommodating the gears (2, 3), a clutch chamber (16 or 17), disposed adjacent to the gear chamber (15) in an axial direction of the rotating shaft (4), and used for accommodating the clutch (5R or 5L); and a communicating portion (34a or 35a), used for communicating the clutch chamber (16 or 17) with the gear chamber (15), where an inclined surface (51a or 52a) facing toward the communicating portion (34a or 35a) is provided on an inner surface of the clutch chamber (16 or 17) opposite to an outer peripheral surface of the clutch (5R or 5L).

BRIEF DESCRIPTION OF THE DRAWINGS

FIG. 1A is a top view, and FIG. 1B is a side view.

FIG. 5A is a diagram of the left clutch chamber and a gear accommodating portion of the gear chamber, and FIG. 5B is a diagram of the right clutch chamber and a strainer accommodating portion of the gear chamber.

DESCRIPTION OF THE EMBODIMENTS

Figure 1B:
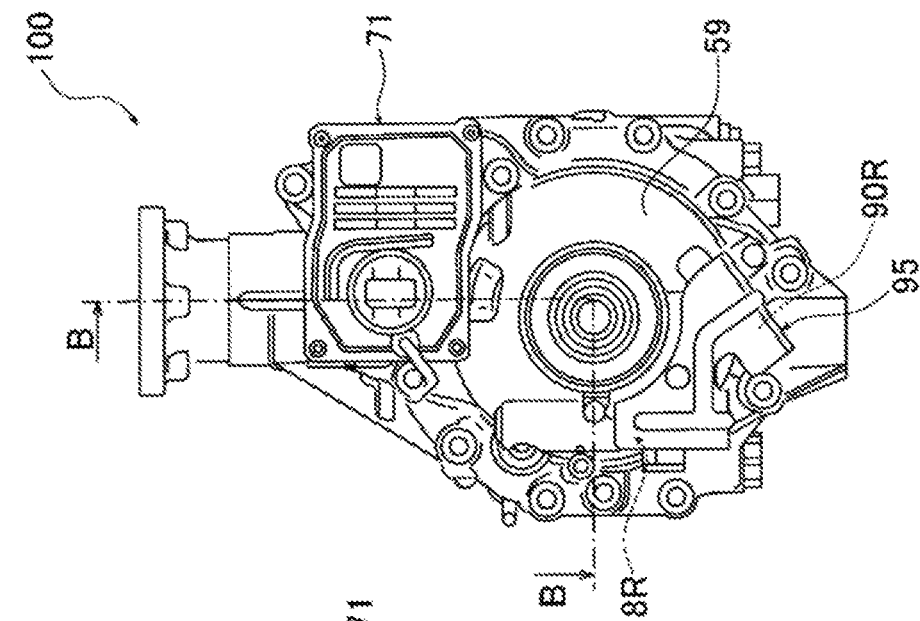
FIGS. 1A and 1B are diagrams of an exterior structure of a power transmission apparatus according to an embodiment of the disclosure.

The disclosure is directed to provide a power transmission apparatus that can prevent an oil surface in the gear chamber from excessively decreasing by means of improving an oil return performance from clutch chambers to a gear chamber, and can effectively prevent oil sucked from a suction opening of an oil strainer from being mixed with air (aeration).

To achieve the objective, the power transmission apparatus of an embodiment of the disclosure is a power transmission apparatus (100) mounted on a vehicle, and characterized by including: a rotating shaft (4), extending along a width direction of the vehicle, and used for transmitting power to a drive wheel of the vehicle; gears (2, 3), disposed on the rotating shaft (4), and used for transmitting power to the rotating shaft (4); a clutch (5R or 5L), used for disconnecting or connecting the power transmitted by the rotating shaft (4) to the drive wheel; a gear chamber (15), used for accommodating the gears (2, 3), a clutch chamber (16 or 17), disposed adjacent to the gear chamber (15) in an axial direction of the rotating shaft (4), and used for accommodating the clutch (5R or 5L); and a communicating portion (34a or 35a), used for communicating the clutch chamber (16 or 17) with the gear chamber (15), where an inclined surface (51a or 52a) facing toward the communicating portion (34a or 35a) is provided on an inner surface of the clutch chamber (16 or 17) opposite to an outer peripheral surface of the clutch (5R or 5L).

According to the power transmission apparatus of the disclosure, when the clutch rotates, oil in the clutch chamber is lifted upward along an outer peripheral surface of the clutch and along a rotating direction. In this case, because the inclined surface facing toward the communicating portion that communicates the clutch chamber with the gear chamber is provided on the inner surface of the clutch chamber opposite to the outer peripheral surface of the clutch, the oil lifted along the outer peripheral surface of the clutch collides with the inclined surface. The oil collided with the inclined surface splashes toward the communicating portion. Therefore, most of the oil splashed at the inclined surface is introduced into the gear chamber through the communicating portion. In this way, the oil in the clutch chamber can be effectively introduced into (return to) the gear chamber by means of oil lift generated by the rotation of the clutch.

In addition, the power transmission apparatus may also be that the communicating portion (34a or 35a) is a communicating hole formed on wall portions (34, 35) between the gear chamber (15) and the clutch chamber (16 or 17), and the power transmission apparatus includes a rib (36 or 37) protruding from the wall portion lower than the communicating portion (34a or 35a) toward the inside of the clutch chamber (16 or 17).

This structure includes the rib protruding from the wall portion lower than the communicating portion toward the inside of the clutch chamber, therefore, the rib may be used for holding some of the oil splashed at the inclined surface toward the communicating portion. That is, before reaching the communicating portion, some of the oil splashed at the inclined surface toward the communicating portion constantly drops due to its own weight. In this case, the rib may be used for holding the constantly dropping oil and introducing the oil into the communicating portion. Thereby, more oil is ensured to be oil that returns from the clutch chamber to the gear chamber through the communicating portion.

In addition, the power transmission apparatus may also include another communicating portion (34b) formed on the wall portion (34 or 35), and the another communicating portion (34b) is formed at a position of the wall portion (34 or 35) lower than the communicating portion (34a) and the rib (36).

This structure includes the another communicating portion, therefore, oil stored at the bottom portion of the clutch chamber can return to the gear chamber through the another communicating portion. Therefore, the oil surface of the gear chamber can be more effectively prevented from decreasing, so as to pursue rationalization of a volume of oil of each component inside the power transmission apparatus.

In addition, the power transmission apparatus may also be that the another communicating portion (34b) is formed at a position higher than an oil surface (L2) of the gear chamber (15) when the power transmission apparatus (100) operates.

According to this structure, the another communicating portion is formed at the position higher than the oil surface of the gear chamber when the power transmission apparatus operates, therefore, when the power transmission apparatus operates, the oil stored at the bottom portion of the clutch chamber can effectively return to the gear chamber through the another communicating portion. Therefore, by using this structure, oil moving to the clutch chamber along with the operation of the power transmission apparatus is enabled to effectively return to the gear chamber, so as to pursue the rationalization of the oil surface (the volume of the oil) of each component inside the power transmission apparatus.

In addition, the power transmission apparatus may also include an oil pump (7) used for conveying oil stored in the gear chamber (15) to the clutch chamber (16 or 17), and an oil strainer (66) connected to the oil pump (7) is accommodated in the gear chamber (15).

This structure includes the oil pump used for conveying the oil stored in the gear chamber to the clutch chamber, therefore there is a risk that the oil surface of the gear chamber decreases due to the operation of the oil pump. However, according to the disclosure, because the inclined surface of the structure is included, the oil in the clutch chamber can be introduced into (return to) the gear chamber by means of the oil lift generated by the rotation of the clutch. Therefore, the oil surface of the gear chamber is effectively prevented from decreasing.

In addition, the gear chamber accommodates the gear disposed on the rotating shaft and the oil strainer connected to the oil pump, therefore, especially in a situation in which a volume of the oil returning to the gear chamber is not sufficient, there is a risk that the oil is mixed with the air (aeration) because the oil stored in the gear chamber is stirred due to the rotation of the gear. Therefore, there is a risk of generating the aeration, that is, a risk of sucking oil mixed with the air into the oil strainer. In view of this risk, in the disclosure, because the inclined surface of the structure is included, the volume of the oil returning from the clutch chamber to the gear chamber can be ensured to be sufficient. Therefore, the risk of generating the aeration may be effectively reduced.

In addition, the power transmission apparatus may also be that the gear chamber (15) includes a gear accommodating portion (15a) accommodating the gear (3) and a strainer accommodating portion (15b) accommodating the oil strainer (66), the gear accommodating portion (15a) and the strainer accommodating portion (15b) are disposed adjacent to each other in the axial direction of the rotating shaft (4), and boundary portions (15c) of the gear accommodating portion and the strainer accommodating portion are in communication with each other; and the strainer accommodating portion (15b) is disposed at a side closer to a center in the axial direction of the rotating shaft (4) than the gear accommodating portion (15a) disposed.

In addition, the power transmission apparatus may also be of the following structure: a protruding portion (33) is formed on an inner surface of the strainer accommodating portion (15b) near the boundary portion (15c); and the protruding portion (33) includes an inclined surface (33a), and the inclined surface (33a) is inclined in such a manner that its position becomes closer to a far side of a rotating direction of the gear (3) in a direction farther away from the boundary portion (15c).

According to this structure, the oil lifted by means of the rotation of the gear that rotates in the gear accommodating portion can be introduced from the gear accommodating portion into the strainer accommodating portion. Therefore, oil in the gear accommodating portion can be effectively separated from the gear, and be actively conveyed to the strainer accommodating portion closer to the center in the gear chamber. In terms of the result, a volume of oil left in the gear accommodating portion can be reduced, therefore, the volume of the oil introduced from the clutch chamber into the gear accommodating portion through the communicating portion can be ensured to be more. Based on the above, the oil moving to the clutch chamber by using the operation of the power transmission apparatus is enabled to effectively return to the strainer accommodating portion, so as to pursue the rationalization of the volume of the oil of each component inside the power transmission apparatus.

In addition, the power transmission apparatus may also be that the clutch chambers (16, 17) are a pair of clutch chambers (16, 17) respectively disposed at two sides of the gear chamber (15) in the axial direction of the rotating shaft (4), the communicating portion (34a or 35a) respectively communicates the pair of clutch chambers (16, 17) with the gear chamber (15); and the inclined surface (51a or 52a) is a pair of inclined surfaces (51a, 52a) correspondingly provided in the pair of clutch chambers (16, 17) respectively.

According to this structure, in the power transmission apparatus, the clutch chambers are respectively disposed at the two sides of the gear chamber, therefore, the oil introduced into the clutch chambers at the two sides can return to the gear chamber in the center by using the inclined surface and the communicating portion. Therefore, the oil surface of the gear chamber can be effectively prevented from decreasing, so as to pursue the optimum of the oil surface (the volume of the oil) of each component inside the power transmission apparatus.

In addition, symbols in the parentheses are shown for referring to the reference numerals of each element in the following embodiments.

According to the power transmission apparatus of the disclosure, by means of improving the oil return performance from the clutch chambers to the gear chamber, the oil surface in the gear chamber can be prevented from excessively decreasing, so as to effectively prevent generating the aeration, that is, prevent oil with air from being sucked from the suction opening of the oil strainer.

Figure 1A:
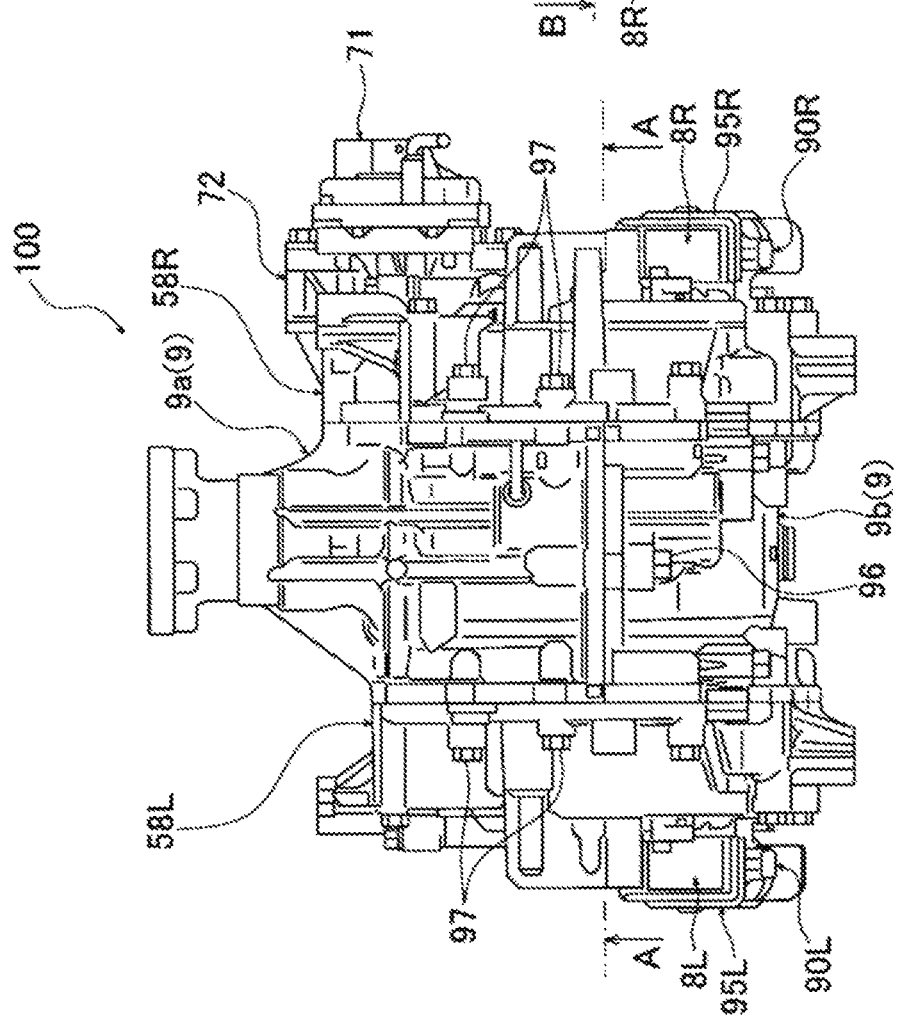
Figure 2:
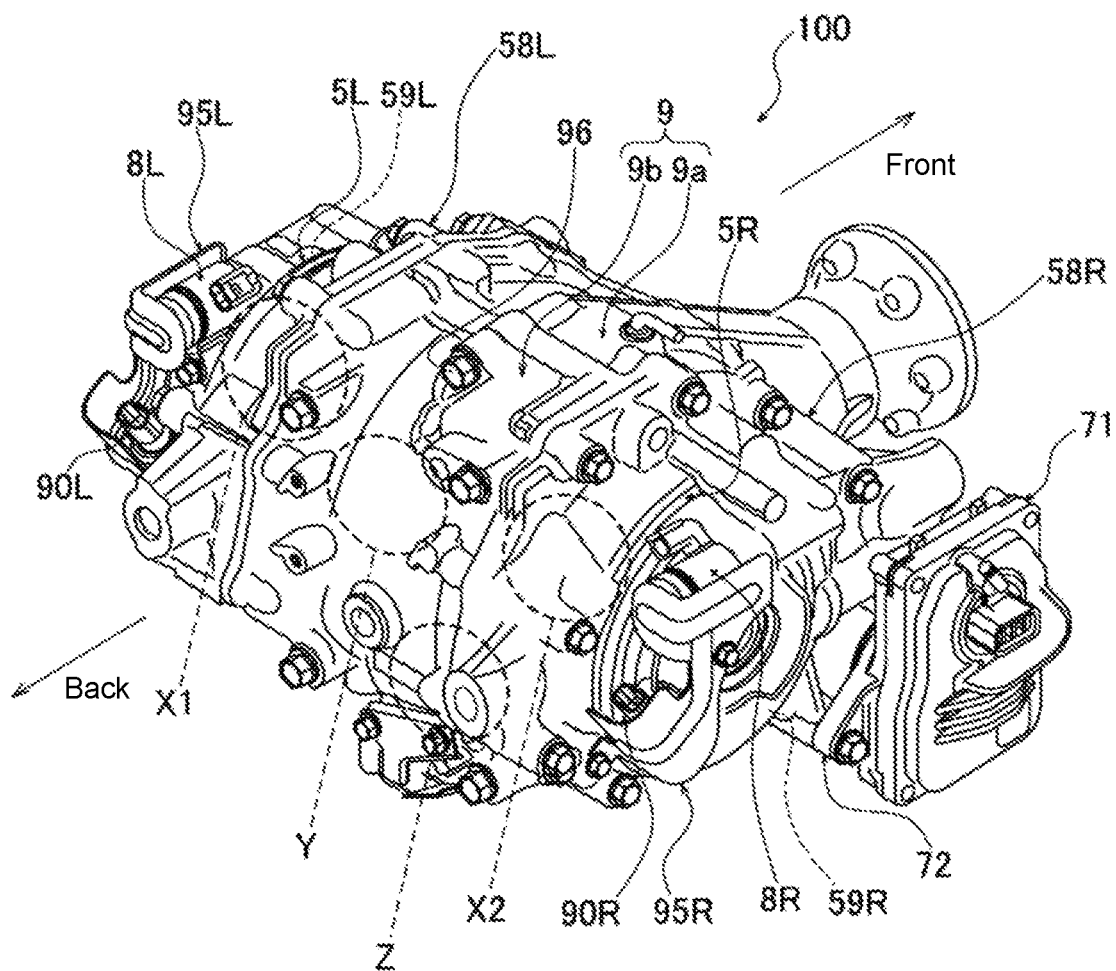
FIG. 2 is a perspective view of an exterior structure of a power transmission apparatus.
Figure 3:
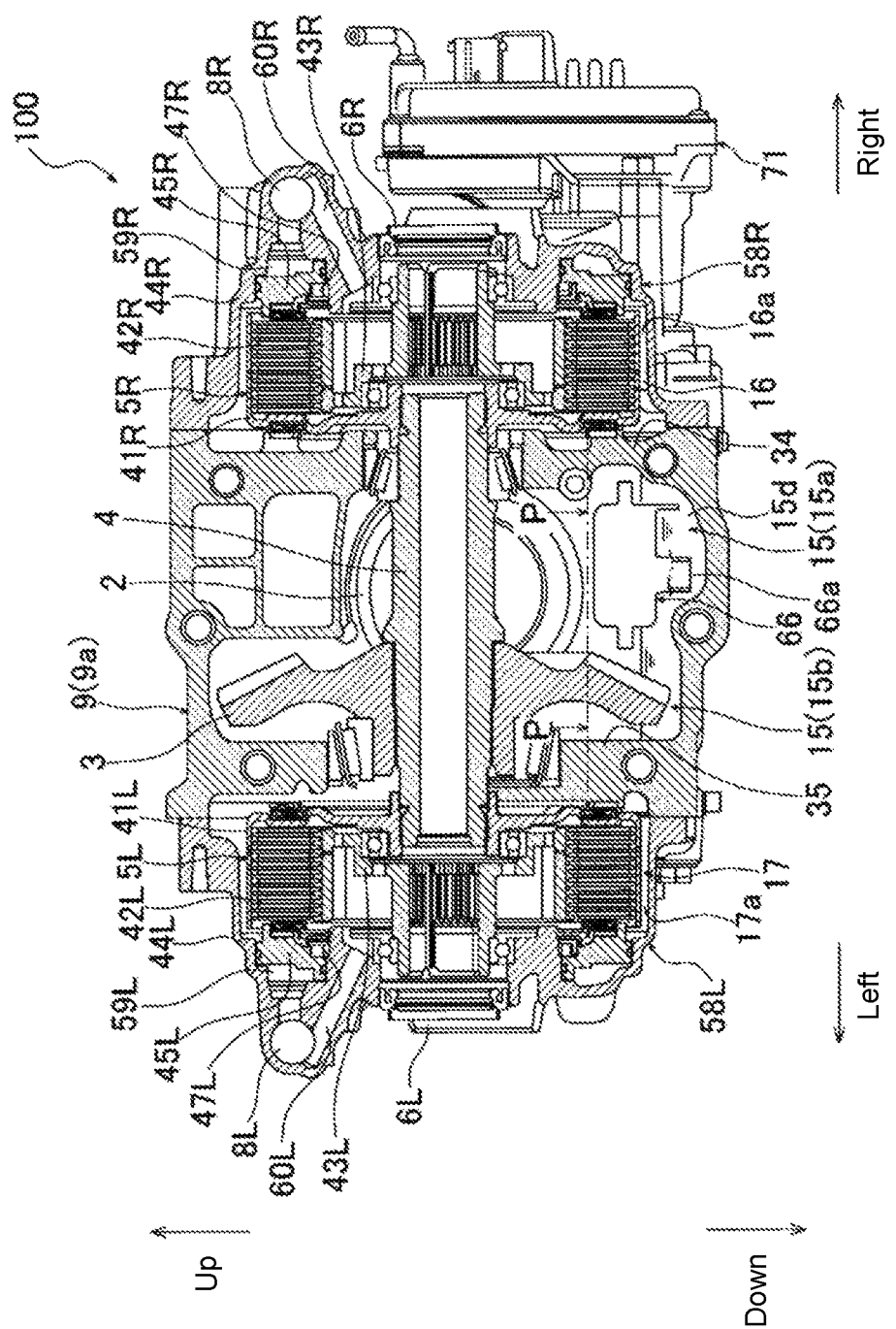
FIG. 3 is a sectional view (a sectional view along A-A of FIG. 1A) of a power transmission apparatus.
Figure 4:
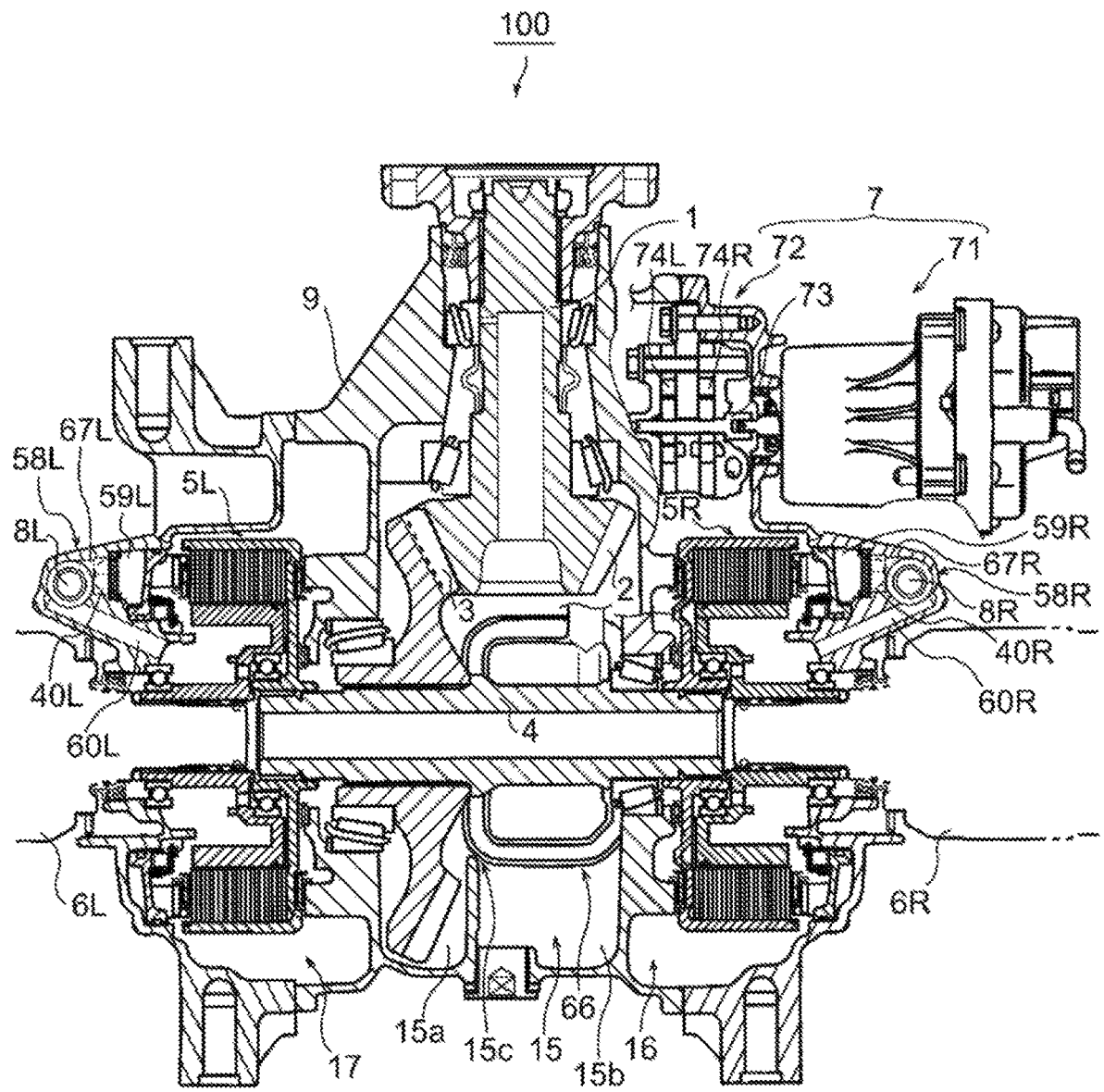
FIG. 4 is a sectional view (a sectional view along B-B of FIG. 1B) of a power transmission apparatus.

The following describes embodiments of the disclosure with reference to the accompanying drawings. FIGS. 1A and 1B are diagrams of an exterior structure of a power transmission apparatus according to an embodiment of the disclosure, FIG. 1A is a top view, and FIG. 1B is a side view. FIG. 2 is a perspective view of an exterior structure of a power transmission apparatus. FIG. 3 and FIG. 4 are sectional views of the power transmission apparatus, FIG. 3 is a sectional view along A-A of FIG. 1A, and FIG. 4 is a sectional view along B-B of FIG. 1B.

As shown in FIG. 4 and the like, a power transmission apparatus 100 is configured as a differential mechanism used for allocating rotation of a drive shaft 1 to left and right wheels (not shown). The drive shaft 1 is connected to a rear end of a propeller shaft not shown, and drive power from a drive source (engine) not shown is transmitted to the drive shaft 1. The power transmission apparatus 100 includes: a drive bevel gear (pinion gear) 2, used for integrally rotating with the drive shaft 1; a driven bevel gear (ring gear) 3, engaged with the drive bevel gear 2; a center shaft (rotating shaft) 4, disposed orthogonal to the drive shaft 1, and connected to the driven bevel gear 3 in a manner of integrally rotating with the driven bevel gear 3; left and right oil pressure clutches 5L and 5R, disposed at the left and right of the center shaft 4; left and right axles 6L and 6R, used for respectively transmitting drive power transmitted by the left and right oil pressure clutches 5L and 5R to the left and right wheels (not shown); an oil pump (an electric oil pump) 7, used for supplying hydraulic oil (oil) to each piston chamber 59L and 59R of the left and right oil pressure clutches 5L and 5R; and left and right pressure regulating valves 8L and 8R, used for regulating pressure of oil discharged from each piston chamber 59L and 59R. In addition, the power transmission apparatus 100 includes a center case 9 used for accommodating the differential mechanism, and side cases 58L and 58R used for respectively accommodating the left and right oil pressure clutches 5L and 5R. As shown in FIG. 1A and FIG. 2, the center case 9 is divided, by using a center of a front-to-rear direction, into two parts, namely, a front case 9a and a rear case 9b. The front case 9a and the rear case 9b are connected to each other in the front-to-rear direction, and are integrally fixed by means of being secured by a bolt 96. The left and right side cases 58L and 58R are integrally fixed at openings at left and right ends of the center case 9 by means of being secured by a bolt 97 (referring to FIG. 1A). In addition, an axial direction of a rotating shaft or an axial direction in the following descriptions represents an axial direction of the center shaft 4 (a left-to-right direction in FIG. 1A). The following further describes each structure.

The driven bevel gear 3 is mounted at an outer periphery of the center shaft 4 disposed on a common axis of the left axel 6L and the right axel 6R. Therefore, when the drive shaft 1 is driven to rotate by using the engine and the propeller shaft, the drive power is transmitted from the drive bevel gear 2 and the driven bevel gear 3 to the center shaft 4, so as to enable the center shaft 4 to rotate.

The center case 9 is internally provided with a gear chamber 15 disposed at a center of the axial direction of the center shaft 4. In addition, the left and right side cases 58L and 58R are respectively internally provided with a pair of clutch chambers 16 and 17 disposed at two sides of the gear chamber 15. Therefore, a casing of the power transmission apparatus 100 is of a structure of three chambers, that is, including the gear chamber 15 and the pair of clutch chambers 16 and 17.

The gear chamber 15 includes a gear accommodating portion 15a and a strainer accommodating portion 15b, the gear accommodating portion 15a is a chamber provided with the driven bevel gear 3, and the strainer accommodating portion 15b is a chamber provided with a part of the drive bevel gear 2 and the oil strainer 66. The gear accommodating portion 15a is located on a left side in the gear chamber 15, and adjacent to a right side of the left clutch chamber 17. On the other hand, the strainer accommodating portion 15b is located on a right side in the gear chamber 15, and adjacent to a left side of the right clutch chamber 16. The gear accommodating portion 15a and the strainer accommodating portion 15b communicate with each other at a boundary portion 15c therebetween (referring to FIG. 4 and FIG. 6), and the gear accommodating portion 15a and the strainer accommodating portion 15b form the gear chamber 15.

As shown in FIG. 3 and the like, the left and right clutch chambers 16 and 17 are respectively provided with the oil pressure clutch 5L and the oil pressure clutch 5R. The right oil pressure clutch 5R in the right clutch chamber 16 includes: a clutch drum (clutch housing) 41R, approximately in a shape of a cylinder, and connected to a right end portion of the center shaft 4; a clutch hub 43R, spline-connected to an end portion of the right axel 6R at an inner peripheral side of the clutch drum 41R; and a friction binding portion 42R, formed by means of alternately laminating multi-layers of friction material (plate) along the axial direction in the clutch drum 41R. In addition, a position adjacent to the friction binding portion 42R is provided with: a piston housing 44R, integrally formed with the right side case 58R; a cylinder piston 45R, accommodated in the piston housing 44R; and a return spring 47R, used for applying a force to the cylinder piston 45R. The piston housing 44R is internally provided with a piston chamber 59R, and the hydraulic oil is introduced between the piston chamber 59R and the cylinder piston 45R. In addition, although detailed descriptions are omitted, the oil pressure clutch 5L disposed in the left clutch chamber 17 is of a same structure as the oil pressure clutch 5R (Numerals of elements of the oil pressure clutch 5L are marked with a suffix L).

As shown in FIG. 4 and the like, the electric oil pump 7 includes a motor portion 71 and a pump portion 72. The motor portion 71 generates rotating power, and the pump portion 72 pumps the hydraulic oil (oil) sucked from the oil strainer 66 to the left and right oil pressure clutches 5L and 5R by using the rotating power. The pump portion 72 is of a structure of double pumps, that is, left and right internally connected gear pumps (oil pumps) 74L and 74R are serially connected to each other on a pump shaft 73. Oil lines (not shown) extending to a downstream side to communicate with the left and right piston chambers 59L and 59R of the left and right oil pressure clutches (clutch apparatuses) 5L and 5R are connected to the oil pumps 74L and 74R. Therefore, the left internally connected gear pump 74L pumps oil to the piston chamber 59L of the left oil pressure clutch 5L, and the right internally connected gear pump 74R pumps oil to the piston chamber 59R of the right oil pressure clutch 5R.

Left and right pressure regulating valves 8L and 8R are linear solenoid valves (electromagnetic pressure regulating valves). As shown in FIG. 1A, FIG. 1B, FIG. 2, and the like, the left and right pressure regulating valves 8L and 8R of this embodiment are mounted by means of inserting into mounting holes (not shown) formed on the side cases 58L and 58R, and are approximately symmetrically disposed in right beside each piston chamber 59L and 59R of the left and right oil pressure clutches 5L and 5R. Therefore, oil lines 67L and 67R from the left and right piston chambers 59L and 59R to the left and right pressure regulating valves 8L and 8R are respectively formed by using the shortest distances. In addition, the oil lines 67L and 67R between the piston chambers 59L and 59R and the pressure regulating valves 8L and 8R are provided with filters (secondly filter: purification component) 40L and 40R used for removing little foreign matter contained in the hydraulic oil flowing on the oil lines 67L and 67R.

In addition, the side cases 58L and 58R are internally provided with lube oil lines 60L and 60R used for introducing oil ejected from the pressure regulating valves 8L and 8R into the inside of the oil pressure clutches 5L and 5R. That is, in the power transmission apparatus 100 of this embodiment, the oil ejected from the pressure regulating valves 8L and 8R are directly introduced into the inside of the oil pressure clutches 5L and 5R by using the lube oil lines 60L and 60R, rather than by using an oil line (an axis oil line) formed inside the center shaft 4, and then the introduced oil are stirred by means of rotation of clutch hubs 43L and 43R, so as to lubricate rotating slide portions of the oil pressure clutches 5L and 5R.

In addition, the oil strainer 66 is disposed near a bottom portion 15d (referring to FIG. 3) of the gear chamber 15. A lower surface of the oil strainer 66 is provided with a suction opening 66a used for sucking hydraulic oil, so as to suck hydraulic oil stored in the bottom portion 15d in the gear chamber 15 through the suction opening 66a.

In addition, the left and right piston chambers 59L and 59R are provided with oil pressure sensors 90L and 90R used for detecting oil pressure of oil in the piston chambers 59L and 59R. The oil pressure sensors 90L and 90R are mounted by means of inserting a sensor portion at a root portion into another mounting hole (not shown) formed on the side cases 58L and 58R. The oil pressure sensors 90L and 90R detect the oil pressure in the piston chambers 59L and 59R by the sensor portions disposed in the piston chambers 59L and 59R through the mounting holes. In addition, covers (protection components) 95L and 95R are provided to cover at least one part of the pressure regulating valves 8L and 8R and the oil pressure sensors 90L and 90R that are exposed from the side cases 58L and 58R.

Figure 5A:
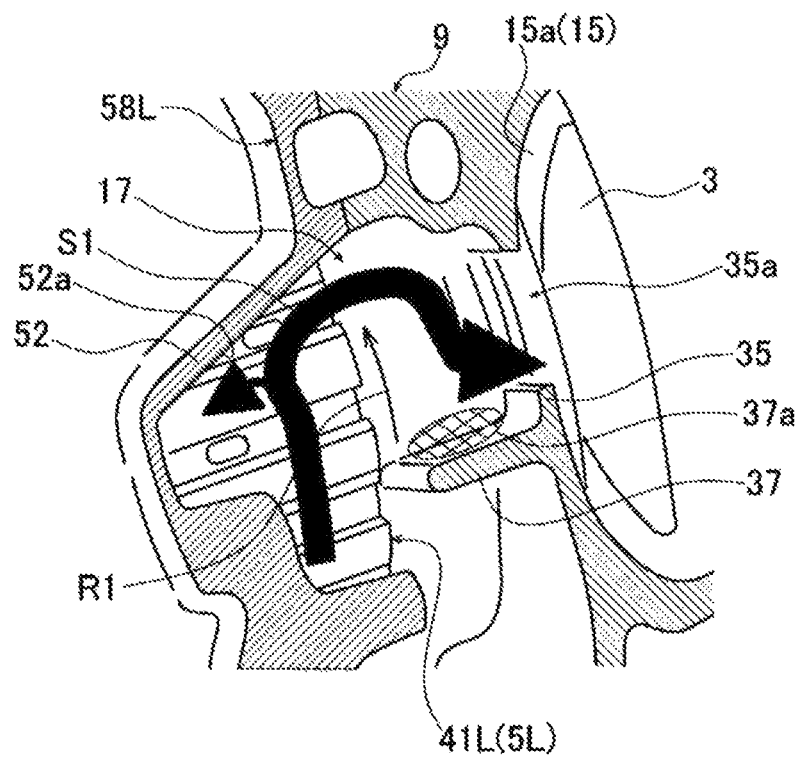
FIGS. 5A and 5B are perspective views (partial sectional views) of an interior structure of left and right clutch chambers and a gear chamber.
Figure 5B:
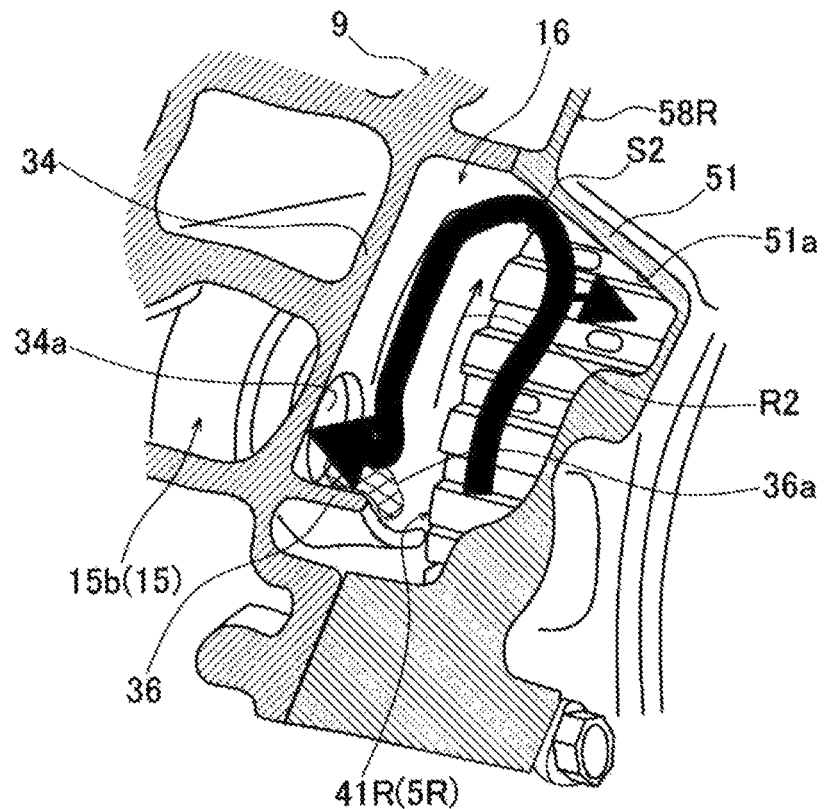

FIGS. 5A and 5B are perspective views (partial sectional views) of an interior shape of the left and right clutch chambers 16 and 17 and the gear chamber 15, FIG. 5A is a diagram of an upper interior shape of the left clutch chamber 17 and the gear accommodating portion 15a of the gear chamber 15, and FIG. 5B is a diagram of an upper interior shape of the right clutch chamber 16 and the strainer accommodating portion 15b of the gear chamber 15. In addition, FIG. 5A is a diagram of an exterior portion (inner surfaces of the center case 9 (the rear case 9b) and the left side case 58L) of a part X1 shown in FIG. 2, and FIG. 5B is a diagram of an exterior portion (inner surfaces of the center case 9 (the rear case 9b) and the right side case 58R) of a part X2 shown in FIG. 2.

As shown in FIG. 5A, the left clutch chamber 17 accommodates the clutch drum 41L of the oil pressure clutch 5L. In addition, the left clutch chamber 17 communicates with the gear accommodating portion 15a of the adjacent gear chamber 15 by using a communicating hole 35a formed on an isolation wall (wall portion) 35. Moreover, in this embodiment, a portion in the left side case 58L forming the left clutch chamber 17 opposite to an outer periphery of an upper side of the clutch drum 41L is provided with an inclined wall 52 disposed opposite to an outer peripheral surface of the clutch drum 41L. An inner surface 52a of the inclined wall 52 forms an inclined surface inclined to the following direction: in two sides with respect to a rotating direction R1 (a traveling direction of the outer peripheral surface of the clutch drum 41L when the clutch drum 41L rotates) of the clutch drum 41L, one side (the right side of the figure) close to the gear chamber 15 (the gear accommodating portion 15a) is set to an inner side of the traveling direction, and the other side (the left side of the figure) away from the gear chamber 15 is set to a front side. In addition, the inclined wall 52 and the inclined surface 52a are formed at a position opposite to a portion (a portion rotating toward a rising direction during rotation) that is closer to the front side in the rotating direction R1 of the clutch drum 41L than an upper end (a top portion) of the clutch drum 41L is. In addition, the communicating hole 35a is formed on an isolation wall 35 in approximately right beside the gear chamber 15 of the inclined wall 52 (the inclined surface 52a). The inclined wall 52 (the inclined surface 52a) is formed as a surface facing toward the communicating hole 35a.

In addition, in this embodiment, a protruding rib 37 facing toward the inside of the left clutch chamber 17 and protruding toward a horizontal direction is formed at a position on the isolation wall 35 lower than the communicating hole 35a. The rib 37 includes a plate portion protruding from a surface of the left clutch chamber 17 of the isolation wall 35 toward the horizontal direction (toward the left side of the figure). That is, the rib 37 is formed as a protrusion at a lower side of the communicating hole 35a and extending from the isolation wall 35 to the left side. In addition, the communicating hole 35a and the rib 37 are formed at a position opposite to an upper side of a half (an upper half part) of the clutch drum 41L. In addition, an end portion of the rib 37 extends to near an end surface (an end surface in the axial direction) of the gear chamber 15 of the clutch drum 41L. Therefore, an oil storage portion 37a used for temporarily storing (keeping) oil lifted by the clutch drum 41L is formed at an upper surface of the rib 37.

In the left clutch chamber 17, when the clutch drum 41L rotates, oil stored in a bottom portion 17a (referring to FIG. 3) of the left clutch chamber 17 is stirred by using the clutch drum 41L. The stirred oil is lifted upward along the outer peripheral surface of the clutch drum 41L and along the rotating direction R1 of the clutch drum 41L. In this case, because the inclined wall 52 (the inclined surface 52a) of the structure is included, the oil lifted along the outer peripheral surface of the clutch drum 41L collides with the inclined wall 52 (the inclined surface 52a). The oil splashes at the inclined surface 52a toward the communicating hole 35a. Therefore, as shown by an arrow S1 in FIG. 5A, most of the oil splashed at the inclined surface 52a is introduced into the gear chamber 15 through the communicating hole 35a. In this way, the oil in the left clutch chamber 17 can return to the gear chamber 15 (the gear accommodating portion 15a) by means of oil lift generated by means of the rotation of the clutch drum 41L.

In addition, the rib 37 is formed in the left clutch chamber 17, therefore, the rib 37 may be used for holding some of the oil splashed at the inclined surface 52a toward the gear chamber 15. That is, before reaching the communicating hole 35a, some of the oil splashed at the inclined surface 52a toward the gear chamber 15 constantly drops due to its own weight. In this case, the rib 37 may be used for holding the constantly dropping oil and introducing the oil into the communicating hole 35a. Thereby, more oil is ensured to be oil that returns from the left clutch chamber 17 to the gear chamber 15 (the gear accommodating portion 15a) through the communicating hole 35a.

In addition, as shown in FIG. 5B, the right clutch chamber 16 accommodates the clutch drum 41R of the oil pressure clutch 5R. In addition, the right clutch chamber 16 communicates with the strainer accommodating portion 15b of the adjacent gear chamber 15 by using a communicating hole 34a forming on the isolation wall (wall portion) 34. Moreover, in this embodiment, an outer peripheral side of the clutch drum 41R in the right side case 58R forming the right clutch chamber 16 is provided with an inclined wall 51 disposed opposite to an outer peripheral surface of the clutch drum 41R. An inner surface 51a of the inclined wall 51 forms an inclined surface inclined to the following direction: in two sides with respect to a rotating direction R2 (a traveling direction of the outer peripheral surface of the clutch drum 41R when the clutch drum 41R rotates) of the clutch drum 41R, one side (the left side of the figure) close to the gear chamber 15 is set to an inner side (an upper side) of the traveling direction, and the other side (the right side of the figure) away from the gear chamber 15 is set to a front side (a lower side). In addition, the communicating hole 34a is formed on the isolation wall 34 lower than the location right beside the gear chamber 15 of the inclined wall 51 (the inclined surface 51a). The inclined wall 51 (the inclined surface 51a) is formed as a surface facing toward the isolation wall 34 and communicating hole 34a.

In addition, in this embodiment, a protruding rib 36 facing toward the inside of the right clutch chamber 16 and protruding toward a horizontal direction is formed at a position on the isolation wall 34 lower than the communicating hole 34a. The rib 36 includes a plate portion protruding from a surface of the right clutch chamber 16 of the isolation wall 34 toward the horizontal direction (toward the right side of the figure). That is, the rib 36 is formed as a protrusion at a lower side of the communicating hole 34a and extending from the isolation wall 34 to the right side. In addition, the communicating hole 34a and the rib 36 are formed at a position at a lower side (a lower position) than the inclined wall 51, and opposite to an upper side of a half (an upper half part) of the clutch drum 41R. In addition, an end portion of the rib 36 extends to near an end surface (an end surface at the left side of the axial direction) of the gear chamber 15 of the clutch drum 41R. Therefore, an oil storage portion 36a used for temporarily storing (keeping) oil lifted by the clutch drum 41R is formed at an upper surface of the rib 36.

In the right clutch chamber 16, when the clutch drum 41R rotates, oil stored in a bottom portion 16a (referring to FIG. 3) of the right clutch chamber 16 is lifted by using the clutch drum 41R. The lifted oil splashes upward along the outer peripheral surface of the clutch drum 41R and along the rotating direction R2 of the clutch drum 41R. In this case, because the inclined wall 51 (the inclined surface 51a) of the structure is included, the oil lifted along the outer peripheral surface of the clutch drum 41R collides with the inclined wall 51 (the inclined surface 51a). The oil splashes at the inclined surface 51a toward the isolation wall 34. When colliding with the isolation wall 34, the splashed oil flows downward along a surface of the isolation wall 34, so as to reaching the communicating hole 34a. In this way, the oil is introduced into the gear chamber 15 through the communicating hole 34a. Therefore, as shown by an arrow S2 in FIG. 5B, the oil splashed at the inclined surface 51a is introduced into the gear chamber 15 (the strainer accommodating portion 15b) through the communicating hole 34a. In this way, the oil in the right clutch chamber 16 can return to the gear chamber 15 by means of oil lift generated by means of the rotation of the clutch drum 41R.

In addition, the rib 36 is formed in the right clutch chamber 16, therefore, the rib 36 may be used for holding some oil flowing downward along the surface of the isolation wall 34, and introducing the oil into the communicating hole 34a. Thereby, more oil is ensured to be oil that returns from the right clutch chamber 16 to the gear chamber 15 through the communicating hole 34a.

Figure 6:
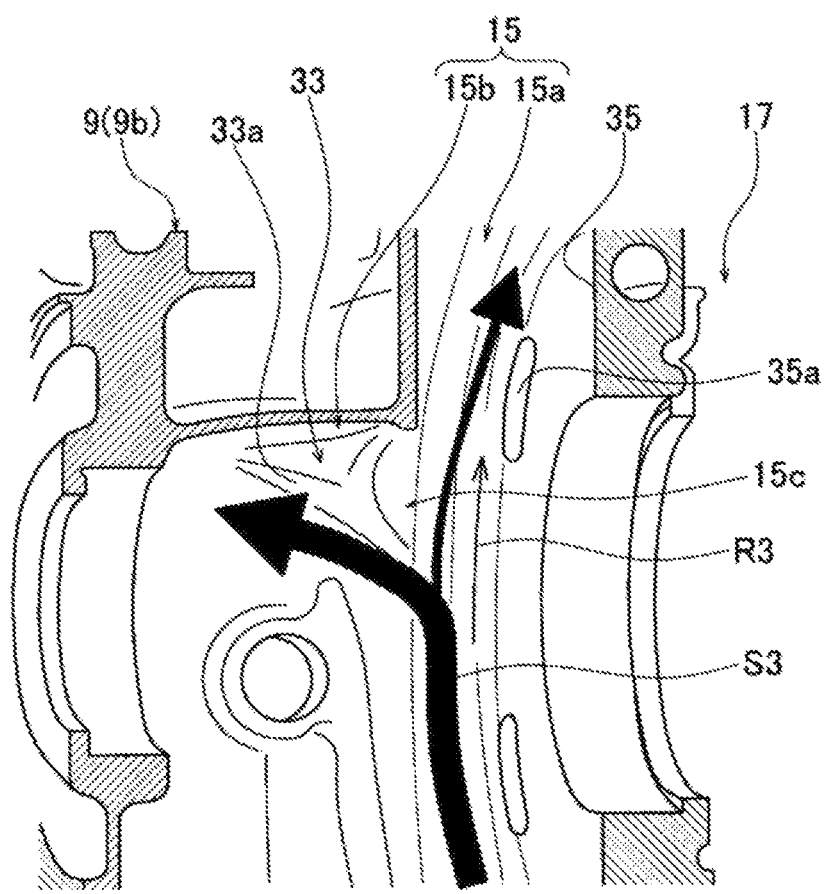
FIG. 6 is a perspective view (a partial sectional view) of an interior structure of a gear chamber (a gear accommodating portion and a strainer accommodating portion).

FIG. 6 is a perspective view (a partial sectional view) of an interior shape of the gear chamber 15 (the gear accommodating portion 15a and the strainer accommodating portion 15b), and is a diagram of an interior portion (inner surfaces of the rear case 9b of the center case 9) of a part Y shown in FIG. 2. As shown in FIG. 6, a protruding portion 33 that protrudes an inner surface of the strainer accommodating portion 15b is formed at a boundary portion 15c between the inner surface of the strainer accommodating portion 15b of the gear chamber 15 and the gear accommodating portion 15a. The protruding portion 33 is formed at a position opposite to a portion rotating toward a rising direction when the driven bevel gear 3 in the gear accommodating portion 15a rotates. In addition, the protruding portion 33 is in a shape of an inclined surface inclined in such a manner that a height position of a lower side surface 33a becomes higher in a direction farther away from the boundary portion 15c. That is, the protruding portion 33 can introduce, by means of making the lower side surface 33a be in the shape described above, most of the oil lifted along with the rotation of the driven bevel gear 3 (not shown in FIG. 6) from the gear accommodating portion 15a to the strainer accommodating portion 15b as shown by an arrow S3. The driven bevel gear 3 rotates in the gear accommodating portion 15a about a rotating direction R3 shown in FIG. 6. Therefore, as shown by the arrow S3, the oil lifted by means of the rotation of the driven bevel gear 3 that rotates in the gear accommodating portion 15a can be effectively separated from the driven bevel gear 3, and be actively introduced into the strainer accommodating portion 15b closer to the center in the gear chamber 15. Thereby, a volume of oil left in the gear accommodating portion 15a can be reduced, and a volume of the oil introduced from the left clutch chamber 17 into the gear chamber 15 (the gear accommodating portion 15a) through the communicating hole 35a described above can be ensured to be more. Based on the above, the oil moving to the left clutch chamber 17 is enabled to effectively return to the strainer accommodating portion 15b of the gear chamber 15 by using the operation of the power transmission apparatus 100, so as to pursue the rationalization of the oil surface (the volume of the oil) of each component inside the power transmission apparatus 100.

Figure 7:
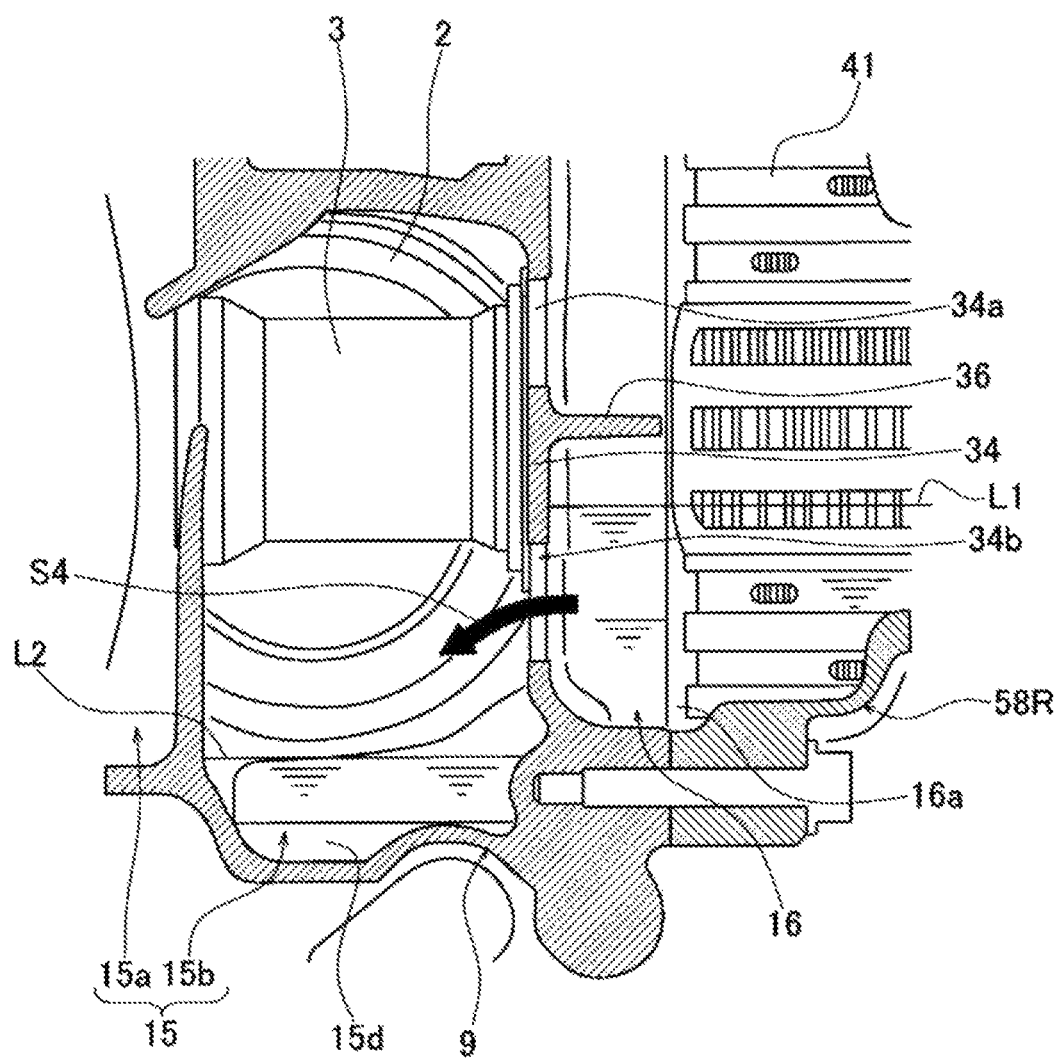
FIG. 7 is a sectional view of a communicating hole formed between a position near a bottom portion of a right clutch chamber and a position near a bottom portion of a gear chamber (a strainer accommodating portion).

FIG. 7 is a perspective view (a sectional view) of the communicating hole 34b formed between the bottom portion 16a of the right clutch chamber 16 and the bottom portion 15d of the gear chamber 15 (the strainer accommodating portion 15b). In addition, FIG. 7 is a diagram of an interior portion (the inner surfaces of the center case 9 and the right side case 58R) of a part Z shown in FIG. 2. As shown in FIG. 7, in the center case 9, besides the communicating hole 34a, a communicating hole 34b (another communicating portion) is additionally formed at a height position near a lower end of the isolation wall 34. The communicating hole 34b communicates the bottom portion 15d of the strainer accommodating portion 15b of the gear chamber 15 or a position near the bottom portion 15d with the bottom portion 16a of the right clutch chamber 16 or a position near the bottom portion 16a that are separated by the isolation wall 34.

In addition, FIG. 7 shows an oil surface L1 of the right clutch chamber 16 and an oil surface L2 of the strainer accommodating portion 15b of the gear chamber 15 when the power from the engine is transmitted to the left and right wheels by using the power transmission apparatus 100 (when the clutch drum 41R, or the drive bevel gear 2, the driven bevel gear 3, and the like rotate). As shown in FIG. 7, when the power transmission apparatus 100 transmits the power to the left and right wheels, oil circulates in the components of the power transmission apparatus 100. Therefore, compared with the oil surface L2 of the strainer accommodating portion 15b, the oil surface L1 of the right clutch chamber 16 is in a higher position. In this case, it is ideal to set the position (the height position) of the communicating hole 34b at a position higher than the oil surface L2 of the gear chamber 15 (the strainer accommodating portion 15b) when the power is transmitted to left and right wheels. If such a setting is applied, when the power transmission apparatus 100 transmits the power to the left and right wheels, as shown by an arrow S4 in FIG. 7, the oil stored in the bottom portion 16a of the right clutch chamber 16 is enabled to effectively return to the strainer accommodating portion 15b through the communicating hole 34b. Therefore, by using this structure, oil moving to the right clutch chamber 16 along with the operation of the power transmission apparatus 100 is enabled to effectively return to the strainer accommodating portion 15b of the gear chamber 15, so as to pursue the rationalization of the oil surface (the volume of the oil) of each component inside the power transmission apparatus 100.

Figure 8:
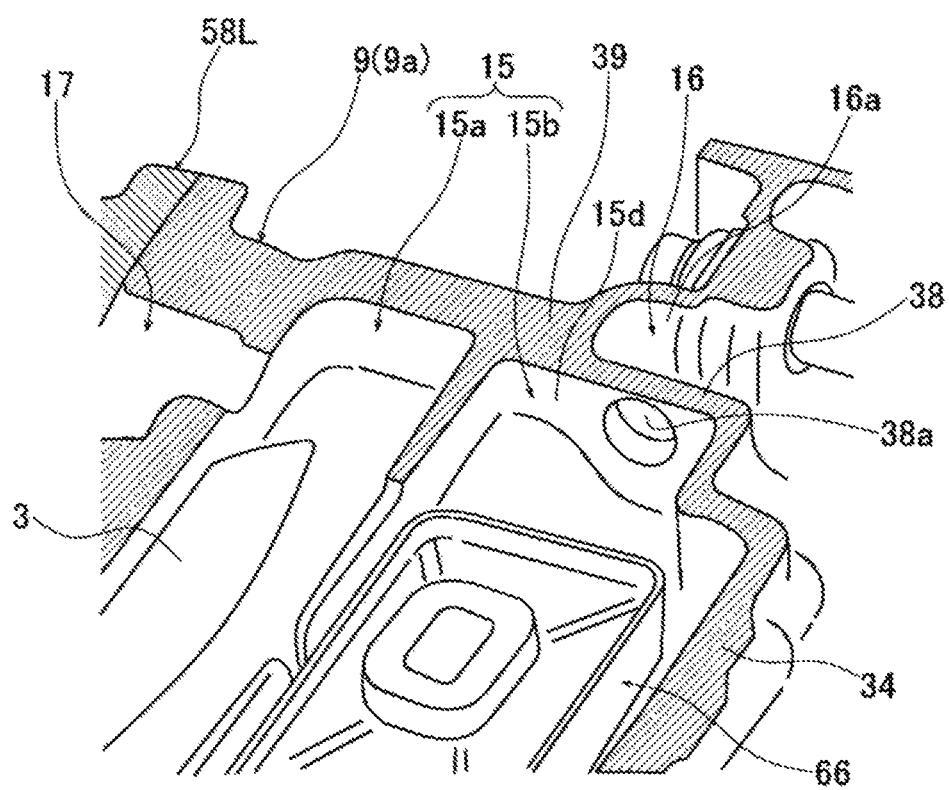
FIG. 8 is a sectional view (a sectional view along P-P of FIG. 3) of an interior structure of a gear chamber, a strainer chamber, and a right clutch chamber.

FIG. 8 is a perspective view (a partial sectional view) of the bottom portion 15d of the gear chamber 15 and the bottom portion 16a of the right clutch chamber 16. In addition, FIG. 8 is a diagram of a part corresponding to a sectional view indicated by P-P of FIG. 3. As shown in FIG. 8, in this embodiment, the right clutch chamber 16 does not directly communicate with the gear accommodating portion 15a of the gear chamber 15 due to the isolation of the wall portion 39 of the center case 9. On the other hand, the right clutch chamber 16 communicates with the strainer accommodating portion 15b of the gear chamber 15. That is, a communicating hole (a communicating portion) 38a formed by a through hole is provided, the through hole runs through a front end of the right clutch chamber 16, a front end of the strainer accommodating portion 15b of the gear chamber 15 and a position near a lower end of a wall portion 38, and the communicating hole 38a is used for communicating the right clutch chamber 16 with the strainer accommodating portion 15b of the gear chamber 15.

Assuming that a wall portion 39 between the right clutch chamber 16 and the gear accommodating portion 15a of the gear chamber 15 is provided with a communicating hole or the like to enable the right clutch chamber 16 and the gear accommodating portion 15a of the gear chamber 15 directly communicate with each other, oil in the right clutch chamber 16 may be forced and introduced into the gear accommodating portion 15a of the gear chamber 15 through the communicating hole due to the rotation of the driven bevel gear 3, causing a risk of excessively decreasing of the oil surface in the right clutch chamber 16. In view of this risk, in this embodiment, the right clutch chamber 16 is not in direct communication with the gear accommodating portion 15a of the gear chamber 15. Therefore, oil may be prevented from being introduced due to the rotation of the driven bevel gear 3, so as to effectively prevent the oil surface in the right clutch chamber 16 from excessively decreasing.

On the other hand, in this embodiment, a communicating hole communicating the right clutch chamber 16 with the gear accommodating portion 15a of the gear chamber 15 is not provided, consequently, the following undesirable situation may occur: when oil in the power transmission apparatus 100 is exchanged, the oil cannot be smoothly discharged from the right clutch chamber 16 to the gear chamber 15 through the communicating hole. However, in view of this, in this embodiment, the communicating hole 38a communicating the right clutch chamber 16 with the strainer accommodating portion 15b of the gear chamber 15 is provided, and a diameter of the communicating hole 38a is set to be a larger diameter, so as to ensure to discharge the oil from the right clutch chamber 16 to the gear chamber 15 when the oil is exchanged.

The following simply describes flowing and actions of oil in a power transmission apparatus 100 of this embodiment. In the power transmission apparatus 100, oil stored in a bottom portion 15d of a gear chamber 15 (a strainer accommodating portion 15b) is sucked from an oil strainer 66 into left and right oil pumps 74L and 74R by means of rotation of an oil pump 7 (the left and right oil pumps 74L and 74R) driven by a motor portion 71. The oil sucked into the left and right oil pumps 74L and 74R is introduced into left and right piston chambers 59L and 59R of left and right oil pressure clutches (clutch apparatuses) 5L and 5R at a downstream side. Pressure of the oil introduced into the left and right piston chambers 59L and 59R is regulated by left and right pressure regulating valves 8L and 8R disposed at a downstream side of each flowing direction of oil of the left and right oil pressure clutches 5L and 5R. The oil flowing out of the left and right pressure regulating valves 8L and 8R is supplied to the inside of the oil pressure clutches 5L and 5R by using lube oil lines 60L and 60R extending from the left and right pressure regulating valves 8L and 8R to the downstream side, to lube the oil pressure clutches 5L and 5R and the like. The oil supplied to the oil pressure clutches 5L and 5R is stored in bottom portions 16a and 17a of clutch chambers 16 and 17. The oil stored in the bottom portions 16a and 17a of the clutch chambers 16 and 17 returns to the gear chamber 15 through communicating holes 34a and 35a by means of lift generated by rotation of the clutches 5L and 5R.

As described above, driven by the motor portion 71, the left and right oil pumps 74L and 74R eject oil. However, if the left and right pressure regulating valves 8L and 8R are open, the oil ejected from the left and right oil pumps 74L and 74R directly passes through the left and right piston chambers 59L and 59R. Therefore, the left and right oil pressure clutches 5L and 5R are not connected. On the other hand, if the left and right pressure regulating valves 8L and 8R are closed in a specific degree, oil pressure of the left and right piston chambers 59L and 59R at an upstream side increases, and the left and right oil pressure clutches 5L and 5R are connected with specific connecting force, to transmit drive power to left and right axles 6L and 6R.

As described above, according to the power transmission apparatus 100 of this embodiment, inclined walls 51 and 52 facing toward the communicating holes 34a and 35a that communicate the clutch chambers 16 and 17 with the gear chamber 15 are disposed on inner surfaces in the clutch chambers 16 and 17 opposite to outer peripheral surfaces of clutch drums 41L and 41R (the clutches 5L and 5R). Therefore, when the clutch drums 41L and 41R (the clutches 5L and 5R) rotate, the oil in the clutch chambers 16 and 17 is lifted along the outer peripheral surfaces of the clutch drums 41L and 41R and along the rotating directions of the clutch drums 41L and 41R. In this case, because inclined surfaces 51a and 52a are included, the oil lifted along the outer peripheral surfaces of the clutch drums 41L and 41R collides with the inclined surfaces 51a and 52a. The oil colliding with the inclined surfaces 51a and 52a splashes at the inclined surfaces 51a and 52a toward the communicating holes 34a and 35a. Therefore, most of the oil splashed at the inclined surfaces 51a and 52a is introduced into the gear chamber 15 through the communicating holes 34a and 35a. In this way, the oil in the clutch chambers 16 and 17 can be effectively introduced into (return to) the gear chamber 15 by means of oil lift generated by the rotation of the clutches 5L and 5R.

In addition, in the power transmission apparatus 100, because ribs 36 and 37 protruding from the wall portions 34 and 35 lower than the communicating holes 34a and 35a toward the inside of the clutch chambers 16 and 17 are included, the ribs 36 and 37 may be used for holding some of the oil splashed at the inclined surfaces 51a and 52a toward the communicating holes 34a and 35a. That is, before reaching the communicating holes 34a and 35a, some of the oil splashed at the inclined surfaces 51a and 52a constantly drops due to its own weight. In this case, the ribs 36 and 37 may be used for holding the constantly dropping oil and introducing the oil into the communicating holes 34a and 35a. Thereby, more oil is ensured to be oil that returns from the clutch chambers 16 and 17 to the gear chamber 15 through the communicating holes 34a and 35a.

In addition, in the power transmission apparatus 100, because the oil pump 7 used for conveying the oil stored in the gear chamber 15 to the clutch chambers 16 and 17 is included, there is a risk that the oil surface of the gear chamber 15 decreases due to the operation of the oil pump 7. However, according to the power transmission apparatus 100 of this embodiment, because the inclined surfaces 51a and 52a of the structure are included, the oil in the clutch chambers 16 and 17 can be introduced into (return to) the gear chamber 15 by means of the oil lift generated by the rotation of the clutches 5L and 5R. Therefore, the oil surface of the gear chamber 15 is effectively prevented from decreasing.

In addition, in the power transmission apparatus 100, the gear chamber 15 accommodates the driven bevel gear 3 disposed on a center shaft 4 and the oil strainer 66 connected to the oil pump 7, therefore, especially in a situation in which a volume of the oil returning to the gear chamber 15 is not sufficient, there is a risk that the oil is mixed with the air (air bubble) because the oil stored in the gear chamber 15 is stirred due to the rotation of the driven bevel gear 3. Therefore, there is a risk of generating the aeration, that is, a risk of sucking oil mixed with the air into the oil strainer 66 from a suction opening 66a. In view of this risk, in the power transmission apparatus 100 of this embodiment, because the inclined surfaces 51a and 52a of the structure are included, the volume of the oil returning from the clutch chambers 16 and 17 to the gear chamber 15 can be ensured to be sufficient. Therefore, the oil surface of the gear chamber 15 may be prevented from excessively decreasing, and the risk of generating the aeration is effectively reduced.

In addition, in the power transmission apparatus 100, the gear chamber 15 includes the gear accommodating portion 15a accommodating the driven bevel gear 3 and the strainer accommodating portion 15b accommodating the oil strainer 66, the gear accommodating portion 15a and the strainer accommodating portion 15b are disposed adjacent to each other in an axial direction of the center shaft 4, and boundary portions 15c of the gear accommodating portion 15a and the strainer accommodating portion 15b are in communication with each other. Moreover, the strainer accommodating portion 15b is disposed at a side closer to a center in the axial direction of the center shaft 4 than the gear accommodating portion 15a disposed.

In addition, the structure may be that a protruding portion 33 is formed on an inner surface of the strainer accommodating portion 15b near the boundary portion 15c, the protruding portion 33 includes an inclined surface 33a, and the inclined surface 33a is inclined in such a manner that that its position becomes closer to a far side of the rotating direction of the driven bevel gear 3 in a direction farther away from the boundary portion 15c.

According to this structure, the oil lifted along with the rotation of the driven bevel gear 3 that rotates in the gear accommodating portion 15a can be introduced into the strainer accommodating portion 15b. Therefore, oil in the gear accommodating portion 15a can be effectively separated from the driven bevel gear 3, and be actively conveyed to the strainer accommodating portion 15b accommodating the oil strainer 66 in the gear chamber 15. In terms of the result, a volume of oil left in the gear accommodating portion 15a can be reduced, therefore, a volume of the oil introduced from the clutch chamber 17 into the gear accommodating portion 15a through the communicating hole 35a can be ensured to be more. Based on the above, the oil moving to the clutch chamber 17 along with the operation of the power transmission apparatus 100 is enabled to effectively return to the strainer accommodating portion 15b, so as to pursue the rationalization of the volume of the oil of each component inside the power transmission apparatus 100.

In addition, in the power transmission apparatus 100, a communicating hole 34b formed on an isolation wall 34 between the right clutch chamber 16 and the strainer accommodating portion 15b of the gear chamber 15 is further included, and the communicating hole 34b is formed at a position on the isolation wall 34 lower than the communicating hole 34b and the rib 36.

According to this structure, because the communicating hole 34b is included, the oil stored in the bottom portion 16a of the clutch chamber 16 is enabled to return to the gear chamber 15 (the strainer accommodating portion 15b) through the communicating hole 34b. Therefore, the oil surface of the gear chamber 15 (the strainer accommodating portion 15b) is effectively prevented from decreasing, so as to pursue further rationalization of the volume of the oil of each component inside the power transmission apparatus 100.

In addition, in the power transmission apparatus 100, the communicating hole 34b is formed at a position higher than the oil surface L2 of the gear chamber 15 when the power transmission apparatus 100 operates.

According to this structure, when the power transmission apparatus 100 operates, the oil stored in the bottom portion 16a of the clutch chamber 16 is enabled to return to the gear chamber 15 through the communicating hole 34b. Therefore, by using this structure, the oil moving to the clutch chamber 16 along with the operation of the power transmission apparatus 100 is enabled to effectively return to the gear chamber 15, so as to pursue the rationalization of the volume of the oil of each component inside the power transmission apparatus 100.

In addition, in the power transmission apparatus 100, the clutch chamber is a pair of clutch chambers 16 and 17 respectively disposed at two sides of the gear chamber 15 in the axial direction of the center shaft 4, the communicating hole is a pair of communicating holes 34a and 35a, respectively disposed at the pair of clutch chambers 16 and 17, and the inclined surface is a pair of inclined surfaces 51a and 52a respectively disposed at the pair of clutch chambers 16 and 17.

According to this structure, in the power transmission apparatus 100 in which the two sides of the gear chamber 15 are respectively provided with the clutch chambers 16 and 17, the oil introduced into the clutch chambers 16 and 17 at the two sides is enabled to effectively return to the gear chamber 15 in the center by using the communicating holes 34a and 35a and the inclined surfaces 51a and 52a. Therefore, the oil surface of the gear chamber 15 can be effectively prevented from decreasing, so as to pursue the optimum of the oil surface of each component inside the power transmission apparatus 100.

The foregoing describes the embodiments of the disclosure, but the disclosure is not limited to the embodiments, and a plurality of variants may be made within the range of the claims, and the technical concept set forth in the specification and accompanying drawings.

What is claimed is:

1. A power transmission apparatus, mounted on a vehicle, the power transmission apparatus comprising:
   a rotating shaft, extending along a transverse direction of the vehicle, and used for transmitting power to a drive wheel of the vehicle;
   a gear, disposed on the rotating shaft, and used for transmitting power to the rotating shaft;
   a clutch, used for disconnecting or connecting the power transmitted by the rotating shaft to the drive wheel;
   a gear chamber, used for accommodating the gear;
   a first clutch chamber, disposed adjacent to the gear chamber in an axial direction of the rotating shaft, and used for accommodating the clutch; and
   a first communicating portion, used for communicating the first clutch chamber with the gear chamber, and formed on a first wall portion between the gear chamber and the first clutch chamber;
   a rib, protruding from the first wall portion toward an inside of the first clutch chamber; and
   an oil pump used for conveying oil stored in the gear chamber to the first clutch chamber, wherein
   a first inclined surface facing toward the first communicating portion is provided on an inner surface of the first clutch chamber opposite to an outer peripheral surface of the clutch, and the first inclined surface and the rib are located on two opposite sides of the first communicating portion,
   wherein an oil strainer connected to the oil pump is accommodated in the gear chamber, and
   wherein the gear chamber comprises a gear accommodating portion accommodating the gear and a strainer accommodating portion accommodating the oil strainer, the gear accommodating portion and the strainer accommodating portion are disposed adjacent to each other in the axial direction of the rotating shaft, boundary portions of the gear accommodating portion and the strainer accommodating portion are in communication with each other, and the strainer accommodating portion is disposed at a side closer to a center in the axial direction of the rotating shaft than the gear accommodating portion.

2. The power transmission apparatus according to claim 1, wherein the first communicating portion is a communicating hole formed on the first wall portion between the gear chamber and the first clutch chamber.

3. The power transmission apparatus according to claim 2, comprising a second communicating portion formed on a second wall portion, and a second clutch chamber disposed adjacent to the gear accommodating portion, wherein
   the second communicating portion is formed on the second wall portion between the gear accommodating portion and the second clutch chamber.

4. The power transmission apparatus according to claim 3, wherein the second communicating portion is formed at a position closer to the rotating shaft than an oil surface of the gear chamber when the power transmission apparatus operates.

5. The power transmission apparatus according to claim 4, wherein
   the first inclined surface and a second inclined surface are a pair of inclined surfaces correspondingly provided in the first clutch chamber and the second clutch chamber respectively.

6. The power transmission apparatus according to claim 2, further comprising a second clutch chamber, a second communicating portion, and a second inclined surface, wherein the first clutch chamber and the second clutch chamber are a pair of clutch chambers respectively disposed at two sides of the gear chamber in the axial direction of the rotating shaft;

the first communicating portion and the second communicating portion respectively communicate the pair of clutch chambers with the gear chamber; and the first inclined surface and the second inclined surface are a pair of inclined surfaces correspondingly provided in the first clutch chamber and the second clutch chamber respectively.

7. The power transmission apparatus according to claim 1, further comprising a second clutch chamber, a second communicating portion, and a second inclined surface, wherein the first clutch chamber and the second clutch chamber are a pair of clutch chambers respectively disposed at two sides of the gear chamber in the axial direction of the rotating shaft;

the first communicating portion and the second communicating portion respectively communicate the pair of clutch chambers with the gear chamber; and the first inclined surface and the second inclined surface are a pair of inclined surfaces correspondingly provided in the first clutch chamber and the second clutch chamber respectively.

* * * * *